United States Patent [19]

Barruw

[11] 4,277,095
[45] Jul. 7, 1981

[54] TRUCK RAILS AND TIME SAVER

[76] Inventor: Jacob Barruw, 367 Fern Dr., Ft. Lauderdale, Fla. 33326

[21] Appl. No.: 859,666

[22] Filed: Dec. 12, 1977

[51] Int. Cl.³ .............................................. B62D 33/04
[52] U.S. Cl. .................................... 296/24 B; 62/239; 211/113; 296/155; 296/183; 410/30
[58] Field of Search .................. 296/24 B, 155, 28 M, 296/183; 62/239; 105/367; 211/113

[56] References Cited

U.S. PATENT DOCUMENTS

| 1,578,641 | 3/1926 | Bywater | 296/147 |
| 1,863,714 | 6/1932 | Geiger | 296/24 B |
| 3,399,794 | 9/1968 | Hummel | 296/28 M |

FOREIGN PATENT DOCUMENTS 7515023  6/1977  Netherlands ........................ 296/24 B Primary Examiner—David M. Mitchell
Assistant Examiner—John A. Carroll
Attorney, Agent, or Firm—Malin & Haley

[57] ABSTRACT

This invention relates generally to food storage truck construction. More specifically this invention relates to devices for overhead storage of meats on tracks adapted for incorporation into truck design for hauling of the same. The track design incorporates the overhead storing mechanism, with releasable locking devices which operate in conjunction with insulaed roll down doors. Hence, hanging meats are securely held in place until the truck is positioned on a loading dock at which time the roll down door is raised above the rails and releases track locks.

4 Claims, 4 Drawing Figures

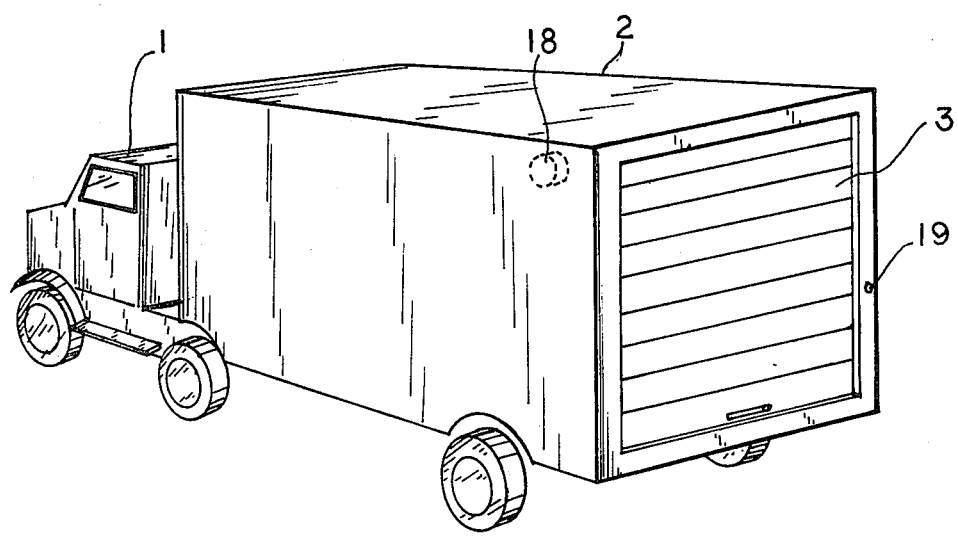
FIG. 1
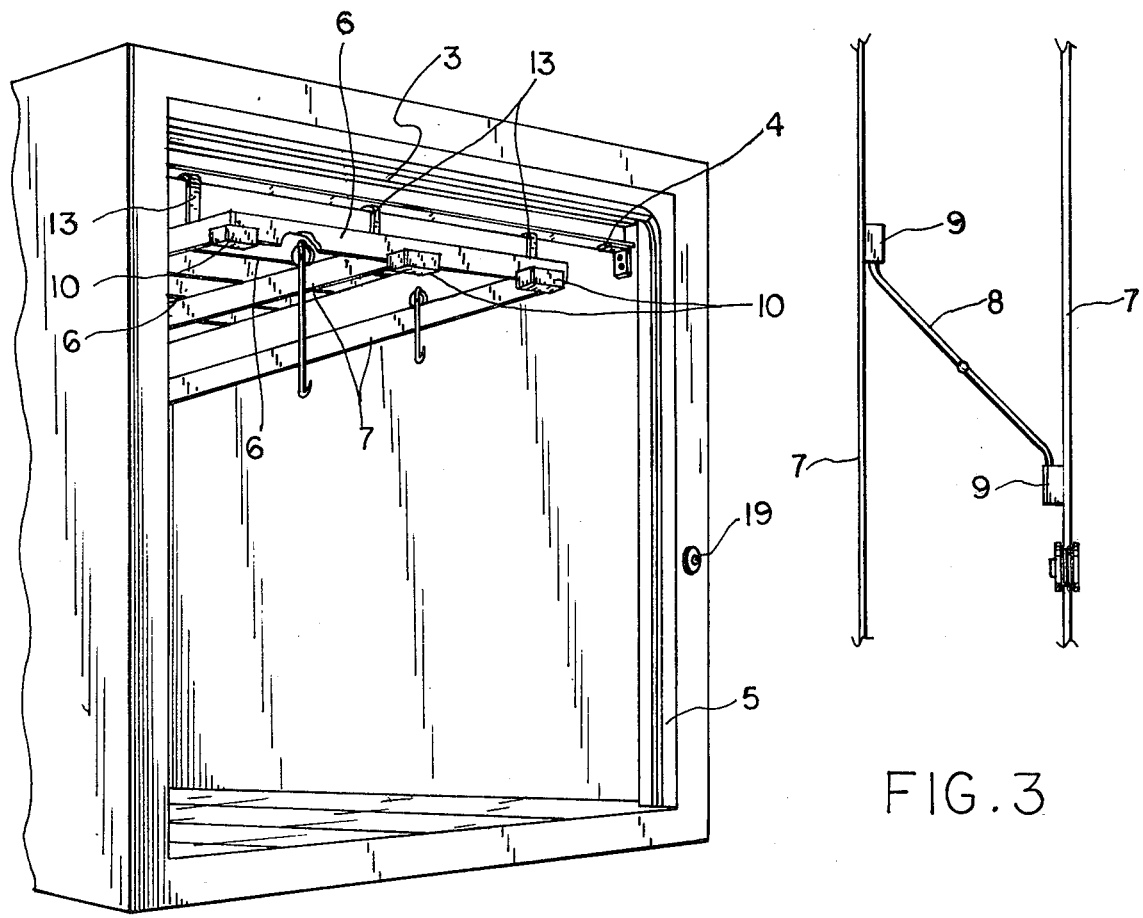
FIG. 2
FIG. 3

TRUCK RAILS AND TIME SAVER

BACKGROUND OF THE INVENTION

1. Field of the Invention

The field of this invention is the construction of mobile units for the transportation of perishable food stuffs. More specifically the field of this invention is the construction of truck bodies adapted for the carring of hanging meats on tracks or rails within the body of the truck. Such tracks being adapted for releasably holding such hanging meats in a secure position within the truck. The field of this invention further embraces the means of releasing said securing means when the particular truck body is opened for the removal of such meats.

2. Description of the Prior Art

Many different prior art devices have been devised which teach various elements of the instant invention. Some of these various elements are typified by the following: U.S. Pat No. 2,590,533 by HAMER teaches generally the addition of cross beams for supporting the rails of overhead meat hanging structures thereby allowing a space between the roof and said cross beams, although it is not necessarily obvious therefrom that such space may be utilized for the storing of an overhead door. U.S. Pat. No. 3,572,815 by HACKNEY teaches the use of folding or overhead doors for truck-bodies although not of the refrigerated variety and finally U.S. Pat. No. 2,827,118 by WENDT teaches insulated folding or overhead doors for refrigeration units. While these patents are typical of the prior art, there are several inherent problems left to be solved thereby. First, no means is taught showing how such hanging meats are prevented from sliding across the rails when some have been removed due to the acceleration of the carrying vehicle which still allow the hanging meats to be carried by the rails when removal is required. Further, no prior art devices allow the use of folding or overhead doors for refrigerated truck units.

It is an object of this invention to provide a truck body which allows overhead meat storage in combination with overhead doors.

It is a further object of this invention to provide a truck body wherein the hanging meats are securely held in relative position until removal is required.

BRIEF DESCRIPTION OF THE DRAWINGS

FIG. 1 is a perspective end view of the truck body showing the insulated overhead doors in a down position.

FIG. 2 is an end view of the truck body showing the inner overhead meat hanging apparatus with the overhead door stored above.

FIG. 3 is a top view of the meat hook rails illustrating a cross over switching apparatus.

SUMMARY OF THE INVENTION

Figure 4:
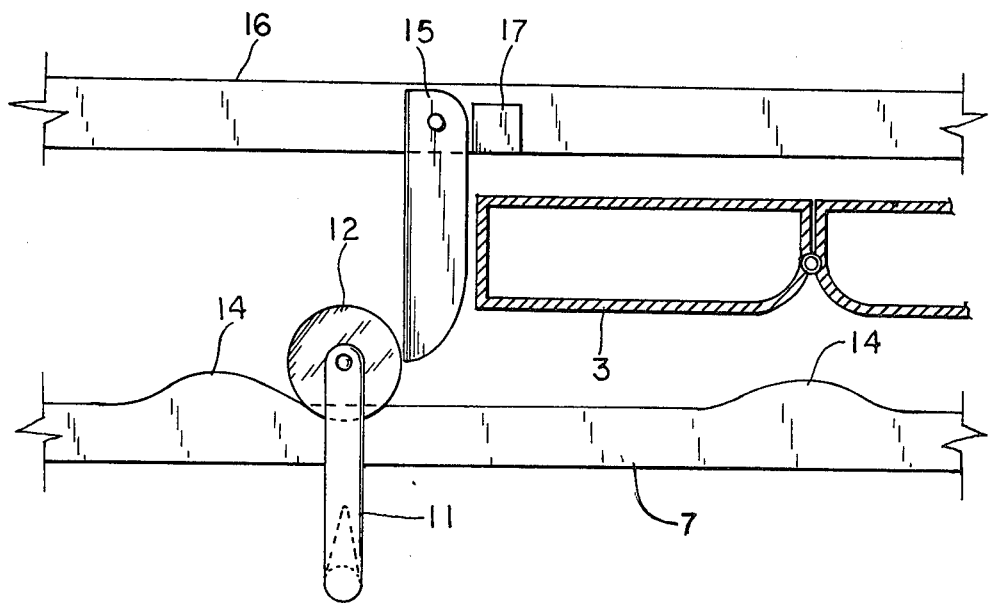
FIG. 4 is a side view of a releaseable meat hook locking apparatus engaging said overhead door.

This invention is essentially a truck body having overhead meat hanging apparatus designed to allow the storing of an overhead door on the rear of the truck, or at the side for that matter so that the door of said truck may remain closed until the operator has positioned the body at a loading dock. Normally, a driver must first open the doors of the truck before backing to the dock should the dock be slightly higher than the doors of the body, which more often than not is the case. This causes a loss not only of the refrigerated condition of the inside of the storage area wherein the meat is stored but often sunlight is allowed to strike the meat and discoloring the same. Where an overhead door is provided for such refrigerated truck bodies, the door may be opened after positioning at the dock regardless of the height of the dock. Further, should the unloading of the truck be delayed, the overhead door may remain closed until actual unloading commences. Further, meat hanging apparatus such as is herein described often uses meat hooks having rollers thereon which ride on suspended rails. This is so because normally such meat is simply in transit and is not permanently hung. Accordingly, easy movement of such meat on the rails and from one set of rails to another is facilitated by the use of such rollers. The inherent disadvantage however is that the hanging meats will roll back and forth in a truck due to the acceleration thereof and bang against the sides of the truck body and other meat and become damaged simply through the act of being carried.

The instant invention eliminates that problem by providing locking bars which are engaged when the overhead door is lowered and disengaged when the overhead door is raised.

DESCRIPTION OF THE PREFERRED EMBODIMENT

With reference to the drawings, FIG. 1 shows a truck 1 having a truck body 2 with insulated overhead type doors 3 at the rear thereof. FIG. 2 shows the rear of said body 2 in greater detail and shows the overhead door 3 stored inside the truck body 2 above meat hanging apparatus 4. Said apparatus 4 is so designed as to allow passage of door 3 over the sides and above said apparatus 4 registered in door tracks 5 attached to the sides of said truck vertical and longitudinally of said truck body 2, such that when said door is raised it proceeds from a vertical position to a horizontal position adjacent to and parallel with the top of said truck body 2 for storage.

Meat hanging apparatus 4 comprises a plurality of cross bars 6 transverse of said truck body 2 and spaced longitudinally thereof fixedly attached to the sides of said body 2 near the top thereof but below said door 3 when the same is in a stored position. Attached to said cross bars 6 are a plurality of braces or spacers 13. Attached to spacers 13 are a plurality of longitudinal rails 7 adapted for receiving the rollers of meat hooks. Said rails 7 are spaced transverse of said body 2 and longitudinal of said cross bars 6. It is contemplated that rails 7 are to be attached to the bottom of said cross bars 6 in a generally horizontal disposition. It is recognized, however, that either end thereof may be raised depending on the particular application so as to bias the loads on said meat hooks toward one end or the other of said rails 7.

Interposed between said rails 7 and rotatably attached to said cross bars 6 are crossover rails 8, as shown in FIG. 3. Said crossover rails 8 provide a means for transferring loaded meat hooks between adjacent rails 7 through conventional switching means 9. In addition, it is contemplated that the rear ends of said rails 7 be also provided with conventional switching means 10 for transferring loaded meat hooks to similarly equiped trucks or to loading docks.

FIG. 4 is a detailed view of rails 7 carrying a meat hook 11, having a roller 12 supported thereon. This particular mode of rail 7 has a plurality of raised portions 14 thereon for biasing the meat hook rollers therebetween, although end biasing would operate just as well. Also shown are meat hook locking means comprising a cam 15, rotatably attached to a support 16 which in turn is attached to the top of truck body 2. Said cam 15 is prevented from counterclockwise rotation by interference therewith by a stop 17 and clockwise rotation is inhibited by the biasing of roller 12 against the stop. Thus, to and fro motion of hanging meat hooks is prevented by a plurality of these cams and locks along the length of rails 7. When the door is raised, however, the pressure of the top of door 3 against each of the cams 15 causes the same to overcome the bias of said rollers 12 and assume a position above the door 3 and out of locking position. Thus, when said door is raised the loaded meat hooks may be easily moved about. It is recognized that the raised portions 14 of rails 7 are not absolutely essential and the operating principle would continue where the biasing means comes from acceleration of the vehicle as opposed to curvature or slanting of the rails 7.

A motor 18 for raising and lowering door 3 is actuated by a door lock switch combination thereby insuring the security of the container.

The foregoing is considered illustrative only of the principles and specific embodiment of the invention. Further, since numerous modifications and changes will readily occur to those skilled in the art, it is not intended to limit the invention to strictly that described herein but such is to include all modifications and equivalents falling within the scope of the invention herein claimed.

What is clamed is:

1. An improved meat rack for use in a mobile transportation compartment having an overhead door on at least the unloading end which travels in guide rails longitudinally adjacent the roof of the compartment in a plane parallel to the roof when the door is opened and closed either manually or by a prime mover, comprising:

a plurality of first elongated members attached to the sides of said compartment transverse of the longitudinal axis thereof and below said roof thereof;

a plurality of spacers attached to said first elongated members, said spacers projecting downwardly therefrom;

a plurality of second elongated members attached to said spacers and disposed transverse of said first elongated members;

a plurality of third elongated members, each said third elongated member attached to said roof and disposed in parallel, coplanar relation with a respective second elongated member;

a plurality of meat hooks, each said meat hook movably connected to a respective second elongated member, each said meat hook movable in a longitudinal direction with respect to said compartment;

a plurality of cam means, each said cam means for preventing longitudinal movement of a respective meat hook in one direction each said cam means pivotally connected to a respective third elongated member and extending downwardly therefrom into the path of a respective meat hook and the path of said overhead door;

a plurality of stop means, each said stop means for preventing rotational movement of a respective cam means in one direction, each said stop means attached to a respective third elongated member, adjacent a respective cam means;

a plurality of biasing means, each said biasing means for biasing a respective meat hook from longitudinal movement in one direction, each said biasing means spaced a predetermined distance from a respective cam means to allow the portion of said meat hook which is movably connected to said respective second elongated member to fit therebetween;

said overhead door having a top edge which when the door is opened contacts each said cam means forcing said cam means to rotate in a direction against a respective meat hook, causing each said meat hook to move longitudinally in the direction of said top edge overcoming the force of said biasing means, allowing further rotational movement of each said cam means out of the path of each said meat hook and the path of said overhead door, allowing longitudinal movement of each said meat hook along a respective second elongated member, each said cam means returning to its original position when said overhead door is closed.

2. An improved meat rack as set forth in claim 1, further comprising:

a plurality of fourth elongated members diagonally disposed between adjacent second elongated members for transferring said meat hooks to and from adjacent second elongated members.

3. An improved meat rack as set forth in claim 1, wherein:

said biasing means includes a plurality of raised portions along each said second elongated member.

4. An improved meat rack as set forth in claim 1, wherein:

each said meat hook is rotatably connected to a respective roller;

each said roller riding along a respective second elongated member.

* * * * *